United States Patent
Shore et al.

(10) Patent No.: US 8,206,682 B2
(45) Date of Patent: Jun. 26, 2012

(54) METHOD FOR RECOVERING CATALYTIC ELEMENTS FROM FUEL CELL MEMBRANE ELECTRODE ASSEMBLIES

(76) Inventors: Lawrence Shore, Edison, NJ (US); Ramail Matlin, Berkeley Heights, NJ (US); Robert Heinz, Ludwigshafen (DE)

( * ) Notice: Subject to any disclaimer, the term of this patent is extended or adjusted under 35 U.S.C. 154(b) by 546 days.

(21) Appl. No.: 12/466,903

(22) Filed: May 15, 2009

(65) Prior Publication Data

US 2010/0288079 A1    Nov. 18, 2010

(51) Int. Cl.
*B01D 3/00* (2006.01)
*B01D 3/36* (2006.01)
*C22B 11/06* (2006.01)
*C22B 3/06* (2006.01)
*C22B 3/10* (2006.01)

(52) U.S. Cl. ............... 423/658.5; 423/22; 75/744

(58) Field of Classification Search .......... 75/710, 75/711, 715, 743, 744; 429/49; 423/22, 423/658.2; *H01M 6/50; C22B 11/00; C01G 55/00*
See application file for complete search history.

(56) References Cited

U.S. PATENT DOCUMENTS

| 5,133,843 A | 7/1992 | Eisman |
| 2006/0147791 A1 | 7/2006 | Debe et al. |
| 2008/0050623 A1 | 2/2008 | Taniwaki |
| 2009/0049954 A1* | 2/2009 | Shore et al. ............ 75/744 |

FOREIGN PATENT DOCUMENTS

JP    20080036569 A    2/2008

OTHER PUBLICATIONS

J. E. Barnes and J. D. Edwards, "Solvent Extraction at INCO's Acton Precious Metal Refinery," *Chemistry and Industry*, Mar. 6, 1982, 151-155.
M. Alkan, et al, "Solubility of Chlorine in Aqueous Hydrochloric Acid Solutions," *Journal of Hazardous Materials*, vol. 119, Issues 1-3, Mar. 17, 2005, p. 13-18.
U.S. Appl. No. 12/134,394, Shore, et al.
U.S. Appl. No. 12/134,543, Shore, et al.
Machine Translation for JP 2008-036569 A, Feb. 21, 2008.

\* cited by examiner

*Primary Examiner* — Jerry Lorengo
*Assistant Examiner* — Jared Wood
(74) *Attorney, Agent, or Firm* — Bernard Lau (57) ABSTRACT

A method for recovering catalytic elements from a fuel cell membrane electrode assembly is provided. The method includes converting the membrane electrode assembly into a particulate material, wetting the particulate material, forming a slurry comprising the wetted particulate material and an acid leachate adapted to dissolve at least one of the catalytic elements into a soluble catalytic element salt, separating the slurry into a depleted particulate material and a supernatant containing the catalytic element salt, and washing the depleted particulate material to remove any catalytic element salt retained within pores in the depleted particulate material.

9 Claims, 6 Drawing Sheets

METHOD FOR RECOVERING CATALYTIC ELEMENTS FROM FUEL CELL MEMBRANE ELECTRODE ASSEMBLIES

GOVERNMENT SUPPORT

The work described herein was supported, in part, by grant DE-FC36-03GO13104 from the United States Department of Energy. Therefore, the U.S. Government may have certain rights.

BACKGROUND

Fuel cells are devices that release electrical energy using an electrochemical reaction. A major class of fuel cells utilizes hydrogen fuel, and the electrochemical oxidation of hydrogen to water is catalyzed using electrodes containing precious metal catalysts. Precious metal catalytic elements for use in precious metal catalysts include, but are not limited to, platinum (Pt), ruthenium (Ru), palladium (Pd), gold (Au), and rhodium (Rh). It is widely accepted that the high cost and limited supply of platinum and other catalytic elements are obstacles to large scale commercialization of fuel cells.

There are several types of fuel cells. Most common is the polymer electrolyte membrane (PEM) fuel cell. The PEM forms the basis for a membrane electrode assembly (MEA), which is the structure by which hydrogen can be oxidized to generate electricity. An anode (i.e., a negative electrode) is provided on one side of the PEM and a cathode (i.e., a positive electrode) is provided on the opposite side of the PEM. The anode contains a catalyst, typically comprising platinum, for promoting dissociation of hydrogen into electrons and positive hydrogen ions. The cathode also contains a catalyst, typically comprising platinum, for promoting reduction of oxygen. An MEA typically carries a catalytic element loading between about 0.5 mg/cm$^2$ and 4 mg/cm$^2$, although recent research has obtained effective performance with catalytic element loadings as low as 0.15 mg/cm$^2$. Typically, these loadings in current commercial fuel cells translate to about 0.5% to 3.0% by weight of catalytic element in the MEA.

A commonly used polymer electrode membrane is Nafion™ by E.I. DuPont de Nemours Company. Nafion™, a Teflon™-based polymer, is a sulfonated perfluropolymer. Even when using a membrane that is itself free of fluorine, a perfluropolymer ionomer is typically mixed into the electrocatalyst layers (i.e., the anion and the cation) to improve the mobility of the positive hydrogen ions. Additionally, the presence of a fluoride-rich polymer makes the powder of the MEA hydrophobic when the MEA is ground.

In one type of fuel cell, the anode and cathode are coated onto the PEM to form a catalyst coated membrane (CCM). A CCM fuel cell can include platinum, ruthenium, and other catalytic elements. In another type of fuel cell, a carbonaceous gas diffusion layer is applied to the anode and another carbonaceous gas diffusion layer is applied to the cathode to form gas diffusion electrodes (GDEs). A GDE fuel cell can also include platinum, ruthenium, and other catalytic elements. The gas diffusion layers provide for the uniform distribution of hydrogen and oxygen to their respective sides of the PEM, provide a conductive pathway for electricity to be transmitted out of the fuel cell, and provide a porous means for the water produced by the electrochemical reaction to be transported away.

Another type of fuel cell using catalytic elements such as platinum is a alkaline fuel cell (AFC). Still another type of fuel cell using catalysts is a phosphoric acid fuel cells (PAFC), which can use a polybenzylimidazole (PBI) membrane or a silicon carbide matrix saturated with phosphoric acid electrolyte. Regardless of the type, after a period of use, a fuel cell often must be replaced, due to fouling of the catalyst, or for another reason. In particular, after repeated cycling of the fuel cell during operation (i.e., cycling between periods of high and low voltage generation), the catalyst can be become less effective. Rather than simply disposing of a fuel cell that must be replaced, it is highly desirable to recover as much catalytic element as possible from the MEA, due to the value of the precious metal catalytic element.

The conventional approach to recover platinum and other precious metal catalytic elements from an MEA includes combusting the PEM and the carbonaceous diffusion layers, dissolving the resultant ash in acid, and purifying the precious metal using standard refining chemistry. However, the high fluorine content of the MEA, particularly those with Nafion™ or other Teflon™-based membranes, results in toxic emissions of hydrogen fluoride gas (HF) and other fluorine compounds from the combustion process. Therefore, a high degree of catalytic element recovery, without the need to combust the MEA, is desired for a recovery method to be commercially viable.

SUMMARY

In one embodiment, a method for recovering catalytic elements from a fuel cell membrane electrode assembly is provided. The method includes converting the membrane electrode assembly into a particulate material, wetting the particulate material, forming a slurry comprising the wetted particulate material and an acid leachate adapted to dissolve at least one of the catalytic elements into a soluble catalytic element salt, separating the slurry into a depleted particulate material and a supernatant containing the catalytic element salt, and washing the depleted particulate material to remove any catalytic element salt retained within pores in the depleted particulate material.

In another embodiment, a method for recovering catalytic elements from a fuel cell membrane electrode assembly is provided. The method includes cryogenically grinding the membrane electrode assembly into a powder, agglomerating the powder with a binder including polyethylene glycol and a surfactant, forming a slurry comprising the agglomerated powder and an acid leachate adapted to dissolve at least one of the catalytic elements into a soluble catalytic element salt, separating the slurry into a depleted powder and a supernatant containing the catalytic element salt, and washing the depleted powder to remove any catalytic element salt retained within pores in the depleted powder.

In yet another embodiment, a method of recovering catalytic elements from a fuel cell membrane electrode assembly is provided. The method includes granulating the membrane electrode assembly into a granulated material at ambient temperature, wetting the granulated material with an amount of surfactant and sonicating the surfactant and granulated material such that the amount of surfactant required is less than an amount of surfactant required to wet the granulated material without sonication, forming a slurry comprising the wetted granulated material and an acid leachate adapted to dissolve at least one of the catalytic elements into a soluble catalytic element salt, separating the slurry into a depleted granulated material and a supernatant containing the catalytic element salt, and washing the depleted granulated material to remove any catalytic element salt retained within pores in the depleted granulated material.

DESCRIPTION OF THE INVENTION

As used herein the term "catalytic element" is understood to include platinum or other precious metal catalytic material such as ruthenium, palladium, gold, and rhodium. Although the term "platinum" is often used interchangeably with the term "catalytic element," and platinum is frequently discussed as an exemplary catalytic element, it is understood that the methods described herein are equally applicable to other precious metal catalytic elements, including but not limited to ruthenium, palladium, gold, and rhodium.

Figure 1:
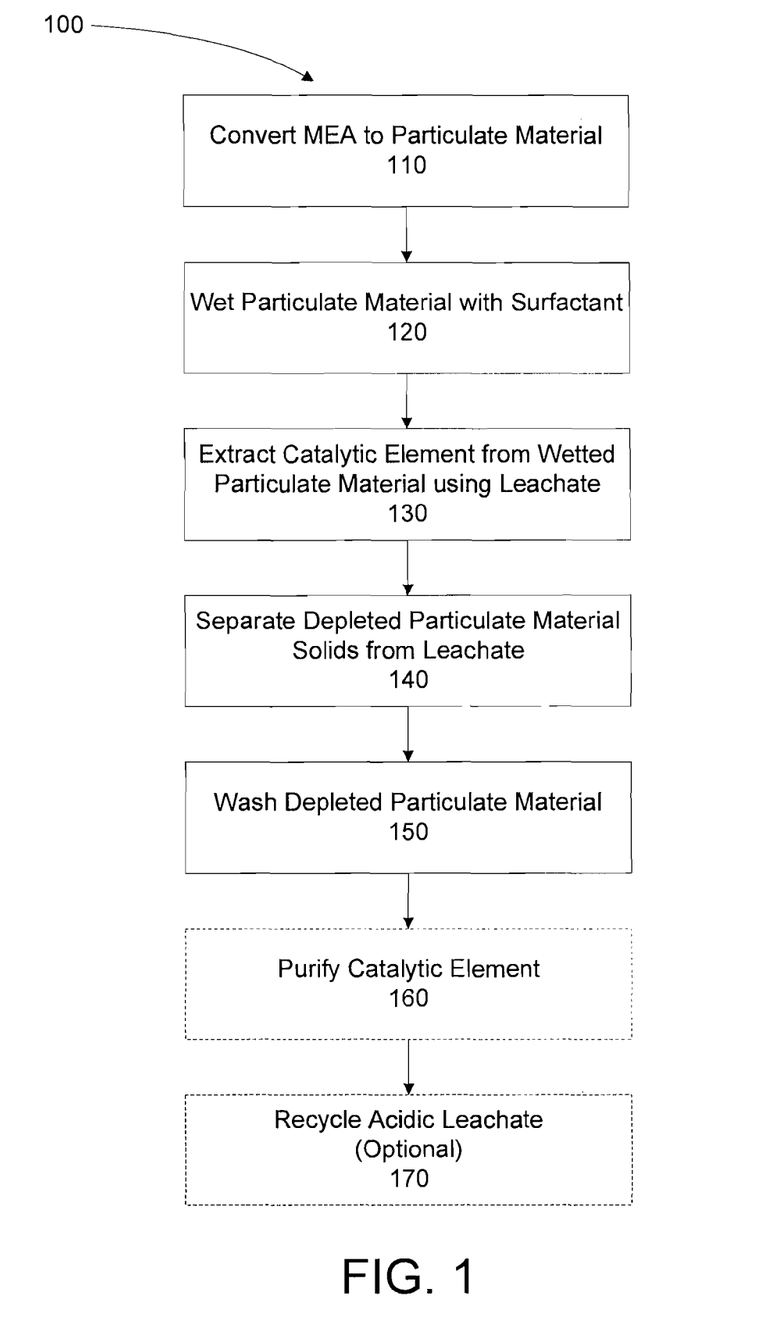
FIGS. 1 through 5 are flow chart depicting embodiments of a method for recovering a catalytic element from a fuel cell membrane electrode assembly.

Referring to the drawings, where like numerals identify like elements, there is shown in FIG. 1 a flow chart representation of a method for recovering a high percentage of precious metal catalyst from fuel cell membrane electrode assemblies. Recovery rates of platinum catalyst in excess of about 99% have been achieved using an embodiment of the method, as described herein. The method eliminates hazardous emissions inherent in the alternative combustion method, and recycles reagents to minimize waste.

Alternative methods of recovering catalytic elements are disclosed in commonly owned U.S. patent application Ser. No. 12/134,394 entitled "Method and Apparatus for Recovering Catalytic Elements from Fuel Cell Membrane Electrode Assemblies," filed Jun. 6, 2008, and incorporated by reference herein in its entirety.

In FIG. 1, an alternative to the conventional approach of combusting a fuel cell membrane electrode assembly is depicted. In one embodiment of a method 100, a catalytic element can be extracted and recovered from an MEA by: converting the MEA into a particulate material, e.g., by grinding or granulating (step 110), wetting the particulate material with a surfactant (step 120), extracting the catalytic element from the particulate material using an acid leachate (step 130), separating the depleted particulate material solids from the catalytic element-rich liquid of the resultant leachate and slurry (step 140), washing the depleted particulate material to recovery any additional catalytic element not dissolved in the leachate (step 150), and purifying the precious metal catalytic element from the liquid using conventional refining technology (step 160). The purification step 160 is shown in phantom because it need not be performed as part of the process disclosed herein. Optionally, the leachate can be recycled (step 170) for use in another extraction cycle. Each of the steps 110 through 170 in the process can comprise multiple operations, processes, or steps.

Methods and apparatus for grinding the MEA into a powder using liquid nitrogen embrittlement are described in commonly owned U.S. patent application Ser. No. 11/844,723 entitled "Simplified Process for Leaching Precious Metals from Fuel Cell Membrane Electrode Assemblies," filed Aug. 24, 2007, and incorporated by reference herein in its entirety. Reagent usage and throughput can be optimized by obtaining accurate measurements of the catalytic element remaining in depleted fuel cell MEA powder after most of the catalytic element has been acid leached from the powder. Methods for conducting such measurements are described in detail in commonly owned U.S. patent application Ser. No. 12/134,543 entitled "Method for Measuring Recovery of Catalytic Elements from Fuel Cells," filed Jun. 6, 2008, and incorporated by reference herein in its entirety.

Figure 2:
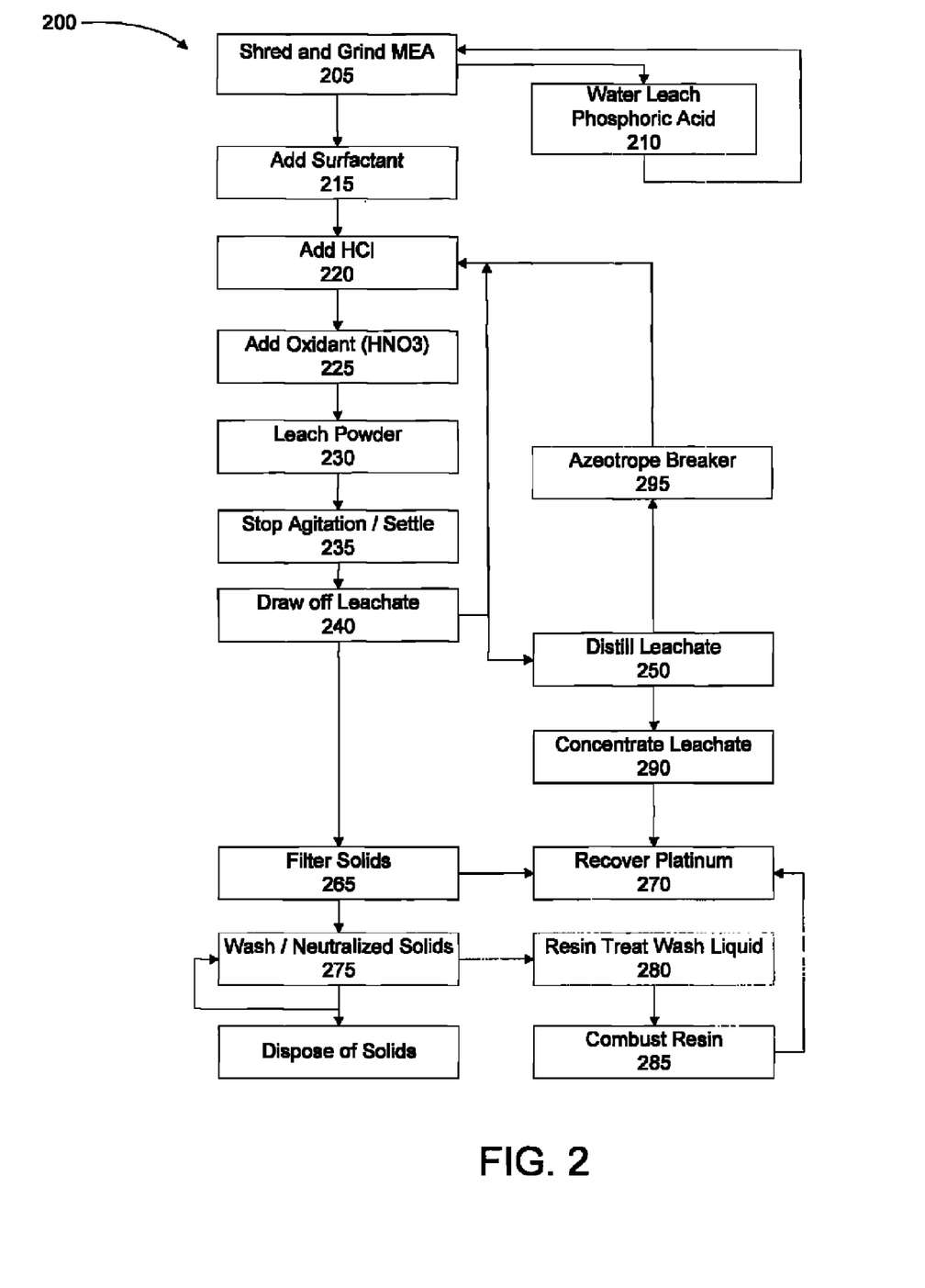

Another embodiment of a method for recovering catalytic elements from fuel cells 200 is depicted in FIG. 2. Sheets of membrane electrode assembly are shredded and ground (step 205). If the MEA contains phosphoric acid, the shredded material can be washed with water to leach the phosphoric acid, and then dried (step 210). Next, a surfactant solution is added using a high shear mixer (step 215) to wet the powder into a slurry or suspension, and HCl is added to the slurry (step 220 in a vessel with agitation. An oxidant is then added to the vessel (step 225) and leaching of the powder is performed (step 230). After sufficient time for leaching of the catalytic elements from the powder, agitation is stopped and the suspension is allowed to settle (step 235) into a sediment and a supernatant. A tube with an in-line filter is inserted into the reactor and the supernatant is drawn off (step 240). The leachate can be distilled (step 250) and the distillate can be used for another leach, or can be directly recycled for another leach. The remaining solids are filtered (step 265). During filtration, the filtrate is collected for platinum recovery (270) while the solids are washed and neutralized (step 275) with alkali for disposal. The wash liquid can be recycled directly for another wash or can be treated with a resin (step 2380) to remove any platinum content. Platinum can be recovered from the resin by combustion (step 285). The primary leachate is concentrated by distillation (step 290) and platinum recovered from the bottom fraction. The distillate is treated in an azeotrope breaker (step 295) to facilitate recovery of HCl above the azeotropic concentration. Each of the steps in the process can comprise multiple operations, processes, or steps, or can be performed in combination.

In seeking to optimize the recovery of catalytic elements from a fuel cell MEA, the efficiency of the leaching process can be improved based on parameters including, but not limited to, the leach medium, the concentration and quantity of leach medium per weight of catalytic element sought to be recovered, and the temperature, pressure, and cycle time of the leach step or steps. In the experiments discussed herein, leaches have been performed in several reactor vessels, including open glass beakers and sealed fluorinated polymer vessels. Investigations have been conducted into suitable materials for commercial scale leaching process equipment to resist the corrosive environment created by a combination comprising one or more of HCl liquid and vapor, chlorine gas, $NO_x$, and steam.

The milled MEA powder comprises electrocatalyst powder particles having pores and interstitial cavities. Each powder particle may contain a combination of catalytic elements, polymer, and other components of the MEA. The MEA powder is generally hydrophobic due to the presence of the fluorine-rich polymer. One effect of the hydrophobicity of the powder is that the powder tends to float on the surface of the acid leachate. Wetting the powder using an aqueous surfactant solution facilitates processing of the powder and enables the powder to be more readily mixed into the leachate. It is believed that using more surfactant than necessary to wet the powder can cause an undesirable dilution of the powder that impedes catalytic element recovery. Although it is not necessary to understand the theoretical reasons why excess surfactant impedes catalytic element recovery, it is thought that the excess surfactant may partially block the pores of the electrocatalyst powder particles, inhibiting the mass transfer of reagents into, and catalytic element out of, the pores.

In one embodiment, the powder can be made hydrophilic using a material such as polyethylene glycol, or PEG, which can serve as an agglomerant. An advantage of using an agglomerant is that it is a dry substance that does not add water to the mixture, whereas a surfactant solution is a wet substance that introduces water into the mixture. Water dilution can be minimized so as to maintain the concentration of the hydrochloric acid in the leachate in an exemplary embodiment. The agglomerant can be added to the milled powder before mixing with the acid leachate. Once the MEA powder has been wetted with a surfactant, precious metal catalytic elements can be leached from the MEA powder.

After the leaching process, the resultant slurry comprises an acid supernatant (i.e., the remnants of the leachate plus the catalytic element salt solution) and solids (i.e., the depleted MEA powder from which most of the catalytic element has been extracted). Phase separation of the products from the leaching step is necessary. In one embodiment, conventional filtration can be used to separate the solids from the supernatant.

After separation, the residual solids can be washed or re-leached using fresh acid leachate, depending on whether a second leaching process is required to achieve the desired catalytic element recovery. While most of the extracted catalytic element is drawn into the supernatant, increased amounts of catalytic element can be retained in the pores of the MEA powder such that washing of the solids is typically required to recover the remainder of the dissolved catalytic element. In some cases, more than one wash may be required. Then, the residual solids can be neutralized.

Improvements/Alternatives to Step of Wetting the Particulate Material with Surfactant.

Figure 3:
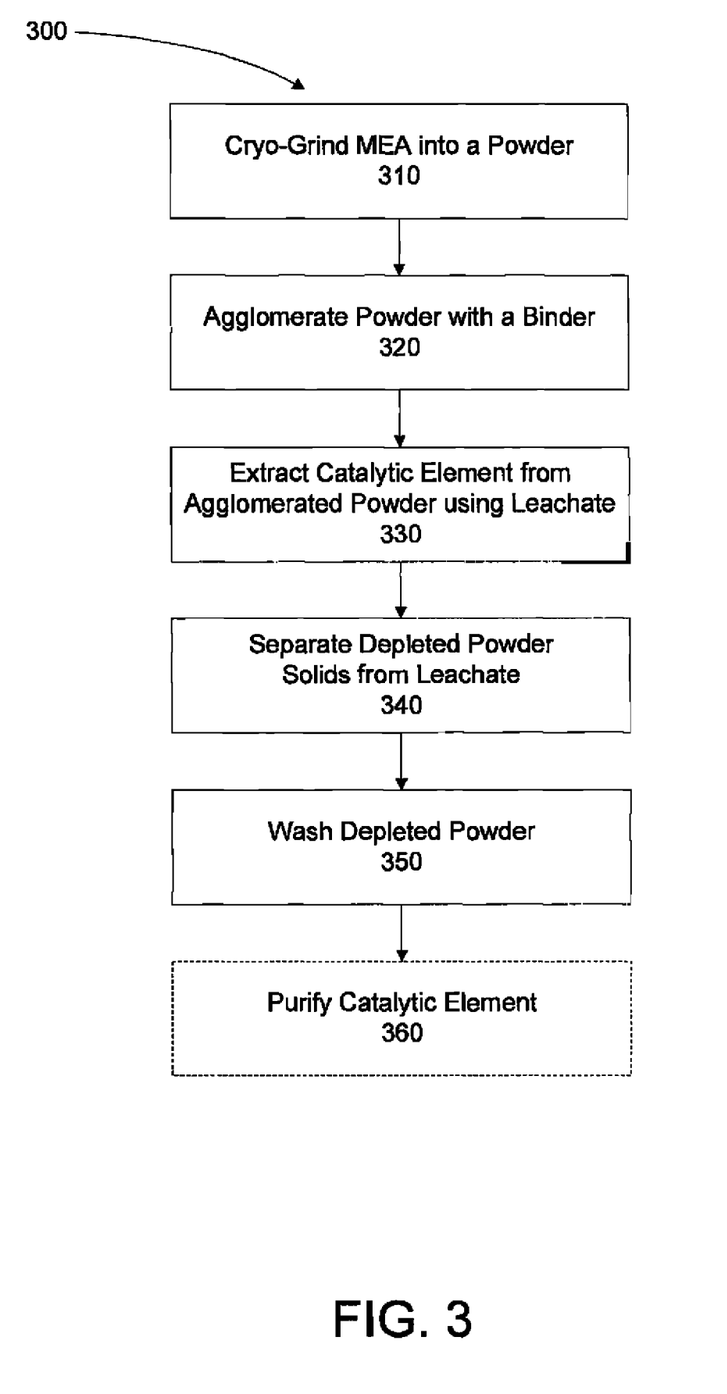
Figure 6:
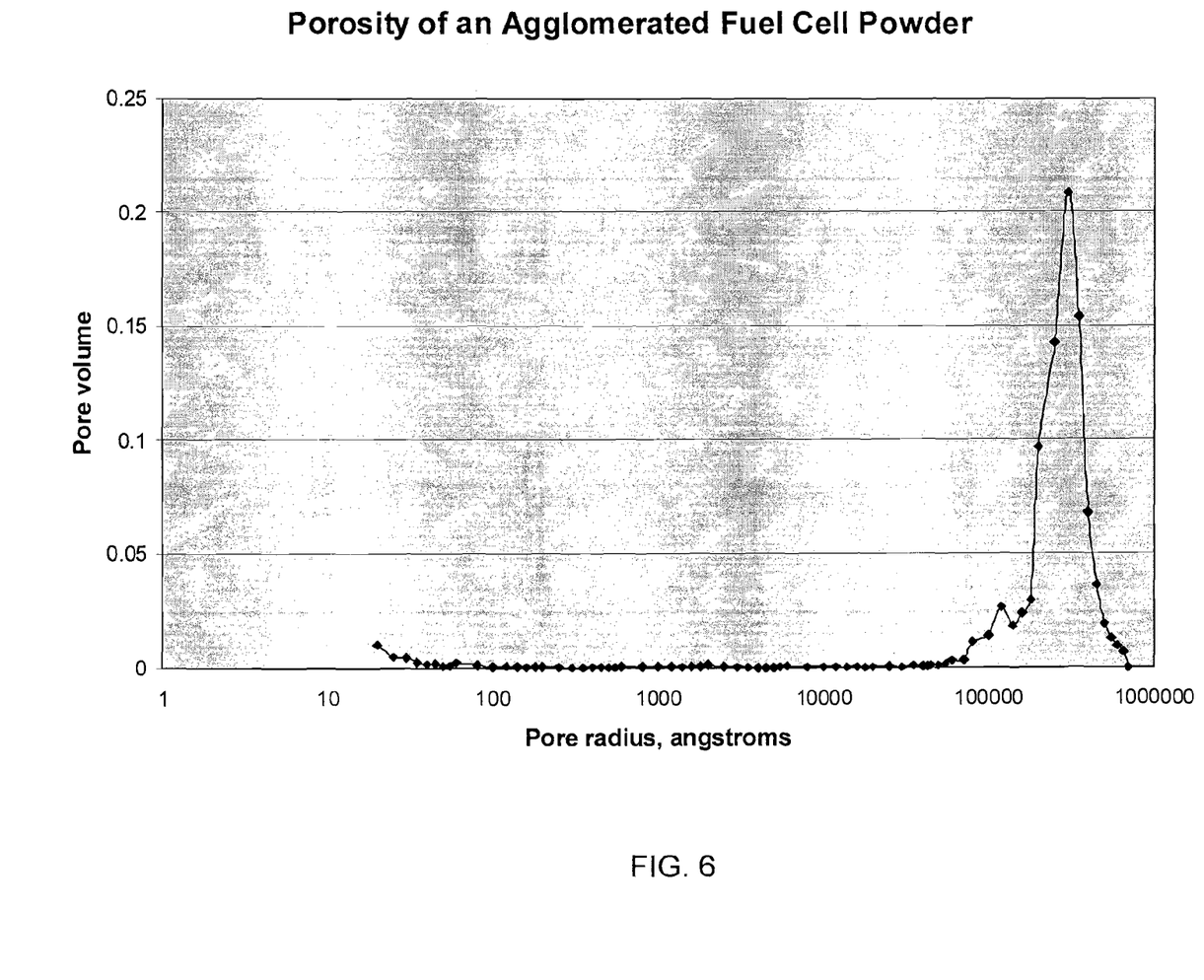
FIG. 6 is a graph showing porosity of an agglomerated fuel cell powder.

When an MEA is ground into a powder, as an alternative to the step 120 of wetting powder with surfactant, the sample material can be made hydrophilic by agglomerating the powder with a binder. A flowchart of an embodiment of a process 300 is shown in FIG. 3, including a step 310 of cryo-grinding the MEA into a powder, a step 320 of agglomerating the powder with a binder, a step 330 of extracting the catalytic element from the agglomerated powder using an acid leachate, a step 340 of separating the depleted powder solids from the leachate, and a step 350 of washing the depleted powder. The process can also include a step 360 of purifying the catalytic element. In one embodiment, the binder is a mixture of polyethylene glycol and a surfactant. For example, an about 9:1 ratio of polyethylene glycol to surfactant may be used. In some experiments, the polyethylene glycol is PEG 4000 and the surfactant is Plurafac® LF 120 sold by BASF. Added as a hot melt, an amount of binder is used so as to dilute the MEA powder by about 25%. It has been determined that the agglomerated powder includes a network of macropores, with a diameter of roughly 30 microns. FIG. 6 is a graph showing porosity of an agglomerated fuel cell powder with pore volume plotted as a function of pore radius.

Handling the agglomerated powder is simpler than working with the surfactant-wet powder and the Pt yield is higher using the conventional process of adding aqua regia to the powder. Initial results achieved Pt yields in excess of about 97%.

TABLE 1

| Sample | Temp (° C.) | Run | Wt. (g) | Start (g) | Finish (g) | Leach (mg) | Residue (mg) | Total (mg) | % Pt | % Yield | Adj. % Pt based on yield |
|---|---|---|---|---|---|---|---|---|---|---|---|
| NE1808 | 125 | 1 | 0.739 | 150 | 202.03 | 13.76 | 0.28 | 13.90 | 1.881 | 97.99 | 2.533 |
|  | 125 | 2 | 0.765 | 150 |  | 14.02 | 0.31 | 14.33 | 1.870 | 97.84 | 2.523 |
| NE1708 | 125 | 3 | 0.710 | 150 | 183.74 | 14.27 | 0.38 | 14.65 | 2.063 | 97.41 | 2.528 |
|  | 125 | 4 | 0.717 | 150 |  | 14.48 | 0.40 | 14.88 | 2.075 | 97.31 | 2.542 |
| NE1808 | 150 | 5 | 0.738 | 150 | 202.03 | 13.48 | 0.28 | 13.76 | 1.864 | 97.97 | 2.522 |
|  | 150 | 6 | 0.738 | 150 |  | 13.25 | 0.36 | 13.61 | 1.844 | 97.35 | 2.484 |
| NE1708 | 150 | 7 | 0.711 | 150 | 183.74 | 14.31 | 0.33 | 14.64 | 2.059 | 97.75 | 2.522 |
|  | 150 | 8 | 0.705 | 150 |  | 13.88 | 0.34 | 14.22 | 2.017 | 97.61 | 2.471 |

Table 1 shows recovery rates after agglomeration of a milled GDE fuel cell powder. By comparison, without agglomeration, leaching of the milled GDE material recovered less than about 90% of the platinum present using standard reagents and aqueous surfactant wetting. Samples NE1708 and NE1808 identify two agglomeration experiments using a batch of milled GDEs made with carbon cloth. The adjusted material balance calculation in the far right column of Table 1 gives the same value for both treatments adjusted for the dilution of the agglomerant, which is expected because of the common starting material. Also, almost identical results were obtained using hot plate surface temperatures of both about 125° C. and about 150° C. for heating the agglomerated powder. This corresponds to reaction temperatures of about 65° C. and about 75° C., respectively.

In the method depicted in FIG. 1, the leaching step 130 is conducted with an oxidant, such as aqua regia, to dissolve the dispersed Pt. The leaching is typically performed in a slurry with about 5% solids. Based on the 1% Pt content of the solids and the need to generate as an intermediate product a 20 g/L Pt solution, an about 40-times concentration of the leachate is formed using distillation.

Improvements/Alternatives to Step of Extracting Catalytic Elements from the Powder Using Leachate.

Independently of the agglomeration work, changes in the leaching process (step 130) were evaluated to reduce reagent consumption in anticipation of using two leaches for recovery of Pt from the agglomerated materials. First, the amount of nitric acid, the source of oxidant in aqua regia, was reduced. The nitric acid was added directly to the pre-weighed portion of test sample and allowed to be soaked up into the pores. In successive tests, the nitric acid was added in diminishing amounts. After the addition of nitric acid, 20 ml of concentrated HCl was uniformly added to the samples. In contradiction to expectation, the recovery of Pt through acid leaching increased as the amount of $HNO_3$ added to wet the powder decreased. The data for these runs is shown in Table 2.

TABLE 2

| Sample | $HNO_3$ (ml) | % $HNO_3$ of control | HCl (ml) | Sample Wt. (g) | % Pt. Yield |
|---|---|---|---|---|---|
| NE1708 | 0.79 | 16 | 20 | 0.520 | 92.7 |
|  | 0.99 | 20 | 20 | 0.518 | 90.9 |

TABLE 2-continued

| Sample | HNO3 (ml) | % HNO3 of control | HCl (ml) | Sample Wt. (g) | % Pt. Yield |
|---|---|---|---|---|---|
| | 1.3 | 26 | 20 | 0.508 | 89.3 |
| | 5.0 | 100 | 20 | 0.521 | 93.8 |
| NE1808 | 0.34 | 6.8 | 20 | 0.580 | 93.6 |
| | 0.66 | 13 | 20 | 0.590 | 91.3 |
| | 0.99 | 20 | 20 | 0.590 | 90.7 |
| | 5.0 | 100 | 20 | 0.593 | 88.1 |

The experiment was repeated using two levels of $HNO_3$ (about 1.0 g and about 3.0 g of acid respectively) to create two different ratios of $HNO_3$ to HCl (and hence two different $HNO_3$:HCl ratios with respect to a stoichiometric ratio for aqua regia). In the repeated tests, the samples were allowed to equilibrate with the added $HNO_3$ for approximately 20 minutes before addition of HCl. The extraction temperature was started at about 150° C., then increased to about 180° C. after about 15 minutes. In this case, with about 1.0 g of $HNO_3$, the Pt yield for the lower level of $HNO_3$ increased to greater than about 98%, while with about 3.0 g the $HNO_3$ reduced the Pt yield to about 93%.

The experiment was repeated using larger sample sizes which confirmed the results. Approximately 1.0 g and 1.5 g of sample, respectively, was wetted with 1 g of $HNO_3$ and allowed to sit for 20 minutes before addition of HCl. After the leaching protocol using a standard heating profile (150° C. followed by 180° C.), the filter paper was re-washed with water to reduce the process loss.

For comparison purposes, the experiment was reversed. In the reversed experiment, 0.5 g of sample was immersed in 20 ml of HCl, then 1.0 g and 3.0 g of $HNO_3$, respectively, was added to the samples. Heating at 150° C. and 180° C. was done as before. Very high levels of Pt recovery, greater than about 99%, were obtained when HCl was added first to the agglomerated material, followed by $HNO_3$. In addition, increased yields of Pt resulted from the use of concentrated HCl above the azeotropic concentration. Results for adding either $HNO_3$ or HCl first are shown in Table 3 for both NE1708 and NE1808.

Figure 4:
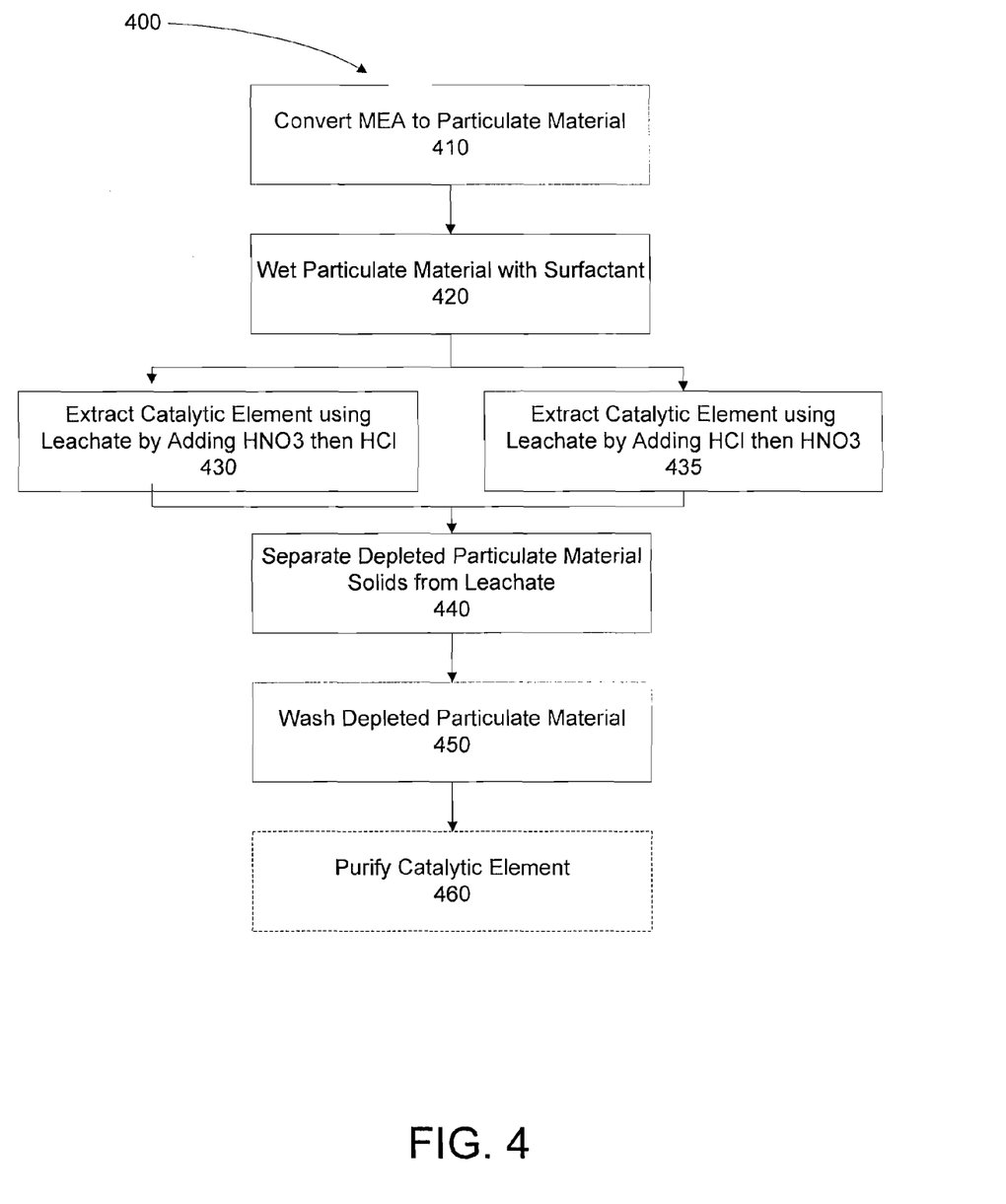

A flowchart of an embodiment of a process 400 is shown in FIG. 4, including a step 410 of converting the MEA into a particulate material, a step 420 of wetting the particulate material with a surfactant, alternative steps of extracting the catalytic element from the agglomerated powder using an acid leachate by either first adding $HNO_3$ to the powder and then adding HCl (step 430) or first adding HCl to the particulate material and then adding $HNO_3$ (step 435), a step 440 of separating the depleted particulate material solids from the leachate, and a step 450 of washing the depleted particulate material. The process can also include a step 460 of purifying the catalytic element.

TABLE 3

| Sample | Acid Priority | HNO3 (g) | Azeotropic HCl conc? | % HCl Excess | Sample (g) | % Pt | % Yield |
|---|---|---|---|---|---|---|---|
| NE1708 | HNO3 | 0.98 | No | 85 | 0.532 | 2.11 | 98.2 |
| | HNO3 | 2.96 | No | 54 | 0.522 | 2.05 | 92.8 |
| | HCl | 1.01 | No | 85 | 0.511 | 2.07 | 99.1 |
| | HCl | 3.04 | No | 53 | 0.534 | 2.09 | 98.9 |
| | HNO3 | 1.03 | No | 84 | 1.000 | 2.04 | 99.1 |
| | HNO3 | 1.07 | No | 83 | 1.509 | 2.04 | 99.0 |
| | HCl | 1.02 | No | 84 | 1.003 | 2.04 | 99.2 |
| | HCl | 1.03 | No | 84 | 1.531 | 2.05 | 99.2 |
| | HNO3 | 1.00 | Yes | 85 | 0.999 | 2.06 | 92.1 |
| | HNO3 | 1.02 | Yes | 84 | 1.517 | 2.05 | 92.4 |
| | HCl | 1.05 | Yes | 84 | 1.034 | 2.05 | 95.8 |
| | HCl | 1.05 | Yes | 84 | 1.520 | 2.06 | 97.1 |
| NE1808 | HNO3 | 0.96 | No | 85 | 0.514 | 1.90 | 97.9 |
| | HNO3 | 2.98 | No | 54 | 0.537 | 1.88 | 91.7 |
| | HCl | 1.04 | No | 84 | 0.518 | 1.88 | 98.9 |
| | HCl | 3.06 | No | 53 | 0.534 | 1.89 | 98.3 |
| | HNO3 | 1.02 | No | 84 | 1.022 | 1.88 | 98.9 |
| | HNO3 | 1.08 | No | 83 | 1.532 | 1.87 | 98.9 |
| | HCl | 1.14 | No | 82 | 1.043 | 1.90 | 99.2 |
| | HCl | 1.12 | No | 83 | 1.546 | 1.89 | 99.1 |
| | HNO3 | 1.08 | Yes | 83 | 1.005 | 1.90 | 95.4 |
| | HNO3 | 1.07 | Yes | 83 | 1.547 | 1.88 | 94.6 |
| | HCl | 1.07 | Yes | 83 | 1.012 | 1.90 | 97.3 |
| | HCl | 1.30 | Yes | 80 | 1.530 | 1.88 | 96.5 |

There is a commonality to the results presented in Table 3. Maximizing the concentration of HCl in the agglomerated material results in approximately 99% of recovery of Pt. This is achieved by starting with addition of concentrated HCl. This is a major insight, since there is a significant impetus to work using HCl with the azeotropic concentration of 21% rather than concentrated HCl. Working with diluted HCl instead of concentrated HCl would facilitate the direct utilization of recycled HCl, which will be near the azeotropic concentration. But because the data obtained in the present work unexpectedly demonstrates the distinct advantage of using concentrated HCl as opposed to an azeotropic concentration of HCl, the HCl distillate obtained during the concentration of the Pt in the leachate solution is desirably upgraded to concentrated HCl using an azeotrope breaker.

With respect to the order of reagents, adding concentrated HCl first to the agglomerated material consistently results in yields of in excess of about 99% Pt, contingent on the amount of $HNO_3$ added. The data shows a small reduction in Pt recovery when $HNO_3$ added increased from about 1.0 g to about 3.0 g, which corresponds to about 15% to about 45%, respectively, of $HNO_3$:HCl stoichiometry in making aqua regia. Conversion of HCl and $HNO_3$ to aqua regia releases the oxidants NOCl and $Cl_2$ at the expense of chloride.

A concern in adding HCl to the reactor first is the potential for corrosion. Titanium is recommended as a reactor liner for the leach process since it offers better pressure containment than a glass-lined reactor while being much less expensive than tantalum, which is even more corrosion-resistant than titanium. Titanium is susceptible to corrosion in HCl, but is passivated by an oxidizing medium. Therefore, in an exemplary embodiment, a glass-lined reactor can be used instead of Ti when working with concentrated HCl. When azeotropic HCl is used in the leaching, the risk of corrosion of titanium is decreased. However, the Pt yields are in the range of about 92% to about 97%, depending on the order of acid addition and the quantity of $HNO_3$ used relative to HCl. Also, the corrosion of a glass-lined reactor is roughly doubled when azeotropic HCl is used in place of concentrated HCl.

A similar argument is made for the test runs with $HNO_3$ added first. The runs with only about 1.0 g $HNO_3$ had about 98% Pt yield, while increasing the $HNO_3$ used to about 3.0 g decreased yield to about 92%. Without being bound by theory, this is believed to be explained by the reduced chloride concentration at the electrode catalyst sites, caused by both the flooding of the agglomerate pores with $HNO_3$ and reduction in free chloride. However, starting with $HNO_3$ is favorable when using titanium since $HNO_3$ passivates the surface of titanium with a refractory oxide coating.

Leaching studies were performed using cyogenically-milled GDE materials obtained from the same lot. The sample identified as HM #9 was directly processed in a hammer mill cooled with liquid nitrogen injection. The second sample, HM #13, which was used to make the agglomerated samples NE1708 and NE1808, was first embrittled in a liquid nitrogen bath, then milled similarly to HM #9. A third sample, a CCM MEA milled at cryogenic temperature in an impact mill (SPEX 6850), was also tested. Leaching experiments were made at two levels of surfactant addition, with individual runs first adding either HCl or $HNO_3$. The data in Table 4 is shown below for the three samples.

TABLE 4

| Sample | Acid Priority | Surfactant (g/% soln.) | $HNO_3$ (g) | Sample (g) | % Pt | % Yield |
|---|---|---|---|---|---|---|
| HM #13 (GDE) | $HNO_3$ | 1.005/1% | 1.07 | 0.503 | 3.06 | 86.8 |
| Aqua Regia | $HNO_3$ | 0.504/5% | 1.05 | 0.503 | 3.00 | 97.2 |
| Pt Yield = 86% | HCl | 1.035/1% | 1.05 | 0.500 | 3.06 | 96.6 |
|  | HCl | 0.506/5% | 1.05 | 0.510 | 3.07 | 98.5 |
| HM #9 (GDE) | $HNO_3$ | 1.027/1% | 1.06 | 0.504 | 2.97 | 87.1 |
| Aqua Regia | $HNO_3$ | 0.512/5% | 1.01 | 0.506 | 3.01 | 92.4 |
| Pt Yield = 79% | HCl | 1.050/1% | 1.08 | 0.507 | 3.02 | 96.2 |
|  | HCl | 0.522/5% | 1.03 | 0.502 | 3.05 | 97.5 |
| CCM-3 | $HNO_3$ | 1.048/1% | 1.05 | 0.505 | 2.63 | 94.8 |
| Aqua Regia | $HNO_3$ | 0.522/5% | 1.08 | 0.518 | 2.59 | 92.7 |
| Pt Yield = 92% | HCl | 1.050/1% | 1.05 | 0.503 | 2.63 | 95.7 |
|  | HCl | 0.525/5% | 1.09 | 0.500 | 2.63 | 94.8 |

The impact of method of wetting was different for the CCM and GDE samples. Using the dilute surfactant (1.0 g of 1% solution), the GDE leaching was lower than with 0.5 g of 5% solution, especially when $HNO_3$ was added first. For the CCM, the reverse was observed when comparing data for two levels of surfactant usage. However, all the results of the experiments using about 1.0 g of $HNO_3$, or roughly 15% of aqua regia stoichiometry, showed Pt percentage yields that far exceeded the Pt recovery observed for the benchmark aqua regia recovery. This observation compares favorably with the data from the agglomerated samples in establishing that limiting nitric acid usage increases free chloride and, as a result, % Pt yield. For example, the CCM sample originally had a Pt yield of 92%. Averaging the four runs with reduced $HNO_3$, a Pt yield of greater than 94% was achieved. For the HM #9 tests, Pt yield increased from 79% to 97%, based on the runs where HCl was added first, and for the HM #13 tests, the yield correspondingly increased from 86% to roughly 98%.

Improvements/Alternatives to Grinding the MEA into a Powder.

Granulation of the MEAs may be an improvement over cry-milling the MEAs into powder. There are four drawbacks in cryo-milling of MEAs. First, there is the need for the infrastructure to supply liquid nitrogen and the capital cost of the equipment. Second, it has been observed that the milling of the MEAs is more efficient when the material is pre-embrittled in liquid nitrogen, but there are difficulties with pre-embrittlement. For example, pre-embrittlement is usually performed in a screw type transport chamber that can become jammed with the MEA material. In some tests of this technology, the shredded MEAs (1/8"×1/2") matted in the screw, resulting in an obstruction. Therefore, redesign of this crucial technology would be required. Third, in a simulation of MEA milling, a mixture of shredded MEAs and gas diffusion layers (GDLs) were first granulated and then cryo-milled. The assay of the granulated material was 1.5% Pt, but the Pt content decreased to 1.3% after the cryo-milling. While this is an extreme case, it illustrates the potential for loss of Pt in fine particles being carried off by the $N_2$ gas released as the mill is chilled and the need for containment using a bag house or the like. Finally, the cryomilled MEAs get "wet" from partial condensation of atmospheric moisture.

Figure 5:
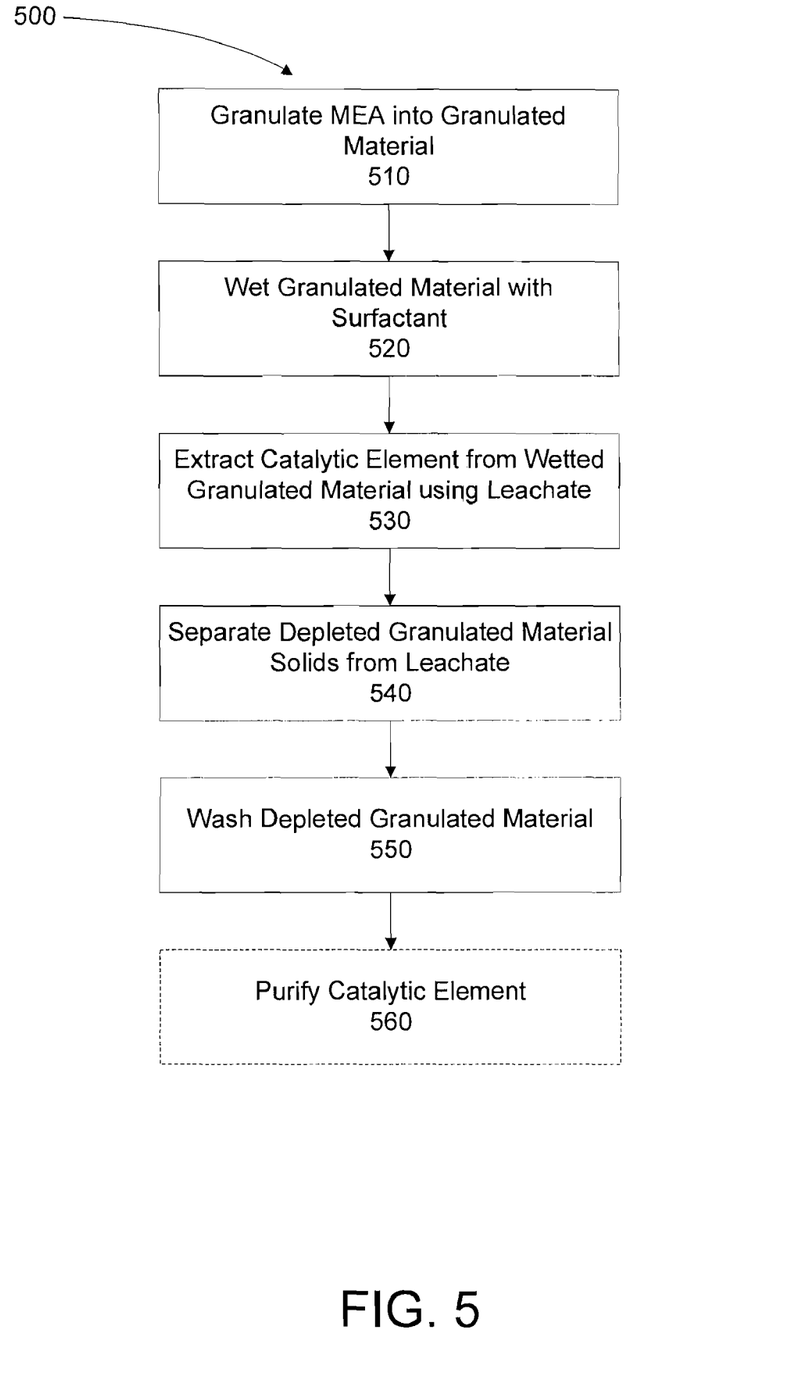

Based on prior experience with granulation, additional trials were performed using bulk MEA samples. A flowchart of an embodiment of a process 500 is shown in FIG. 5, including a step 510 of granulating the MEA into a granulated material, a step 520 of wetting the granulated material with a surfactant, a step 530 of extracting the catalytic element from the granulated material using an acid leachate, a step 540 of separating the depleted granulated material solids from the leachate, and a step 550 of washing the depleted granulated material. The process can also include a step 560 of purifying the catalytic element.

The intact MEAs, both GDE with carbon cloth and CCM with carbon paper, were fed directly into a Hosokawa Polymer Systems Press Side Granulator equipped with a 1/8" screen. The action of the knife blades within the apparatus disintegrated the structure of the MEAs, resulting in a fluffy mass. This was achieved without any external cooling or material pretreatment (i.e., the granulating was done at ambient temperature). Leaching of the granulated material was done to determine the viability of the method, but wetting of the hydrophobic mass conventionally was not convenient.

Sonication of Granulated Material to Promote Wetting.

In view of earlier studies with phosphoric acid removal from PBI-based MEAs using sonication, it was decided to use sonication in step 520 to promote the wetting of the granulated MEAs. Using a sonicator made by Hielscher, it was shown that the granulated material could be easily dispersed with addition of a small amount of surfactant. Surfactant usage was reduced compared to the normal amount used during manual wetting. For the GDE MEA which contained carbon cloth, surfactant usage was reduced by approximately 80%. For the CCM MEA fabricated with carbon paper, surfactant usage was reduced by over 90%. In addition to the radical reduction in the amount of surfactant required, the wetting was performed in a very short period of time; one minute of sonication at 24 kHz and 200 watts was adequate for making the MEA granulate hydrophilic.

The process of wetting deviated from the manual method in that the required amount of HCl was added to the sample mass, followed by a weighed addition of surfactant and sonication. $HNO_3$ equal to roughly 15% of aqua regia stoichiometry was added and the standard heating profile followed. Table 5 gives the data for replicate experiments, differing only by the amount of surfactant used as compared with the original experiments. For comparison purposes, subsamples of the granulated CCM and GDE were ground up cryogenically in the SPEX 6850 mill to determine whether or not additional particle size reduction would yield higher Pt values. The results for leached samples, granulated and granulated plus milled, are listed.

statistically insignificant bias. The results for the rinse study for the leached granulated GDE material are shown in Table 6.

TABLE 6

| Sample | Wt (g) | Surfactant (g) | $HNO_3$ (g) | Treatment | Surf/ Sample | Filtrate (mg) | Residue (mg) | Total (mg) | % Pt | % Yield |
|---|---|---|---|---|---|---|---|---|---|---|
| A | 1.014 | 0.203 | 2.034 | 50 ml hot water | 0.01001 | 20.27 | 0.36 | 20.63 | 2.035 | 98.3 |
| B | 1.009 | 0.223 | 2.008 | 50 ml 10% HCl | 0.01105 | 19.18 | 0.40 | 19.58 | 1.941 | 98.0 |
| C | 1.013 | 0.213 | 2.055 | 50 ml 0.25M NaOH | 0.01051 | 19.32 | 0.27 | 19.59 | 1.934 | 98.6 |

TABLE 5

| | 1 g Sonicated with trace surfactant | | 0.5 g of granulated and milled MEA wet manually | |
|---|---|---|---|---|
| Run | Surfactant Usage (wt/wt) | % Pt Yield | Surfactant Usage (wt/wt) | % Pt Yield |
| | GDE MEAs | | | |
| A | 0.0058 | 97.3 | 0.05 | 97.6 |
| B | 0.0109 | 97.5 | 0.05 | 97.8 |
| C | 0.0157 | 97.5 | 0.02 | 97.1 |
| D | | | 0.02 | 97.2 |
| | Aged CCM MEAs | | | |
| A | 0.0062 | 98.4 | 0.05 | 98.5 |
| B | 0.0022 | 98.1 | 0.05 | 98.6 |
| C | 0.0009 | 98.4 | 0.02 | 98.4 |
| D | | | 0.02 | 98.5 |

For the GDE materials, both granulated and granulated plus milled materials showed a Pt yield of 97.5%. A yield of over 98.4% was obtained for both CCM treatments. By comparison, the embrittled and cryo-ground GDE material that had been agglomerated had showed over 99% Pt recovery. The results for the granulation show that additional milling is unnecessary, but the agglomeration process produces a material that can be leached marginally better.

Sonication to Enhance Filtration Yields.

In an attempt to match the agglomeration yields achieved with milled MEA material, sonication was used in during the step 550 of rinsing or washing of the granulated MEA after leaching. In common practice, the leached MEA, in the form of catalytic element residue, is collected using a paper filter (Whatman #40) in a conical funnel. The catalytic element residue is then rinsed or washed with hot water as a rinse agent, which percolates through the mass. However, herein the practice was modified. Instead of using a paper filter fitted into a conical funnel, a glass filter disc was placed in a cylindrical funnel and the material minimally washed with water as a rinse agent or wash agent. Then the residue was returned to a beaker with 50 ml of leachate. The mixture was sonicated for two minutes at 24 kHz and 200 watts, then the liquid rinse agent was collected by filtration. As is common practice, the residue was then ignited to determine residual Pt content. Because of the use of a glass fiber filter, the residue was first scraped from the filter prior to ignition; this step introduces The data disclosed herein indicates that there is a definite advantage in using sonication and dilute sodium hydroxide as a rinse agent. In particular, sample C, in which NaOH was used as a rinse agent, achieved a overall % Pt recovery of 98.6%, compared to the 97.5% observed for conventional rinsing. This means that residual Pt decreased from 2.5% to 1.5%, for an improvement in unrecovered Pt of 40%.

In sum, it is disclosed herein that by leaching the agglomeration of cryomilled MEAs, a 99% Pt recovery can be achieved. By adding HCl first (i.e., prior to $HNO_3$) more consistent results are produced. In addition, maintaining high concentration of free chloride is believed to be a relevant factor for high Pt recovery. This is achieved by decreasing the amount of nitric acid added and avoiding the use of dilute (azeotropic) HCl. Therefore, an azeotrope breaker is necessary to profitably recover excess HCl during evaporation to concentrate the leached Pt. Further, granulation is a good alternative to pre-embrittlement and cryo-grinding, although the Pt yield may be inferior to leaching the agglomerated material. Sonication is an effective mechanism to wet the granulated MEA with a minimum amount of aqueous surfactant. Finally, sonication in the rinse or wash has been shown to enhance the overall Pt yield of leached granulated MEA (GDE with carbon cloth), particularly if the rinse liquid contains sodium hydroxide.

While the methods and compositions has been disclosed with reference to certain exemplary embodiments, numerous modifications, alterations, and changes to the described embodiments are possible without departing from the sphere and scope of the methods and compositions, as defined in the appended claims and equivalents thereof. Accordingly, it is intended that the methods and compositions and their variations not be limited to the described embodiments, but that it have the full scope defined by the language of the following claims.

We claim:

1. A method for recovering catalytic elements from a fuel cell membrane electrode assembly, comprising: converting the membrane electrode assembly into a particulate material wherein the converting comprises cryogenically grinding the membrane electrode assembly into a powder; wetting the particulate material wherein the wetting comprises agglomerating the powder with a binder wherein the binder is a mixture of polyethylene glycol and a surfactant; forming a slurry comprising the wetted particulate material and an acid leachate adapted to dissolve at least one of the catalytic elements into a soluble catalytic element salt; separating the slurry into a depleted particulate material and a supernatant containing the catalytic element salt; and washing the depleted particulate material to remove any catalytic element salt retained within pores in the depleted particulate material.

2. The method of claim 1, wherein the ratio of polyethylene glycol to surfactant is about 9:1.

3. The method of claim 1, wherein the acid leachate comprises $HNO_3$ and HCl in an $HNO_3$:HCl ratio that is equal to or less than about 45% of the stoichiometric ratio for aqua regia.

4. The method of claim 3, wherein the $HNO_3$:HCl ratio is between about 15% and about 45% of the stoichiometric ratio for aqua regia.

5. The method of claim 3, wherein the $HNO_3$:HCl ratio is equal to or less than about 15% of the stoichiometric ratio for aqua regia.

6. The method of claim 3, wherein the HCl is provided in a concentration greater than an azeotropic concentration of HCl.

7. The method of claim 3, wherein the $HNO_3$ is added to the particulate material prior to adding the HCl.

8. The method of claim 3, wherein the $HNO_3$ is allowed to equilibrate for at least 20 minutes prior to adding the HCl.

9. The method of claim 3, wherein the HCl is added to the particulate material prior to adding the $HNO_3$.

* * * * *

UNITED STATES PATENT AND TRADEMARK OFFICE
CERTIFICATE OF CORRECTION

| | | |
|---|---|---|
| PATENT NO. | : 8,206,682 B2 | Page 1 of 1 |
| APPLICATION NO. | : 12/466903 | |
| DATED | : June 26, 2012 | |
| INVENTOR(S) | : Shore et al. | |

It is certified that error appears in the above-identified patent and that said Letters Patent is hereby corrected as shown below:

ON THE TITLE PAGE

Insert --(73) Assignee: BASF Corporation, Florham Park, NJ (US)--

Signed and Sealed this
Twenty-fourth Day of July, 2012

David J. Kappos
*Director of the United States Patent and Trademark Office*